Feb. 24, 1925. 1,527,794
W. W. GRAY
SPLIT RING PISTON PACKING
Filed Nov. 28, 1924
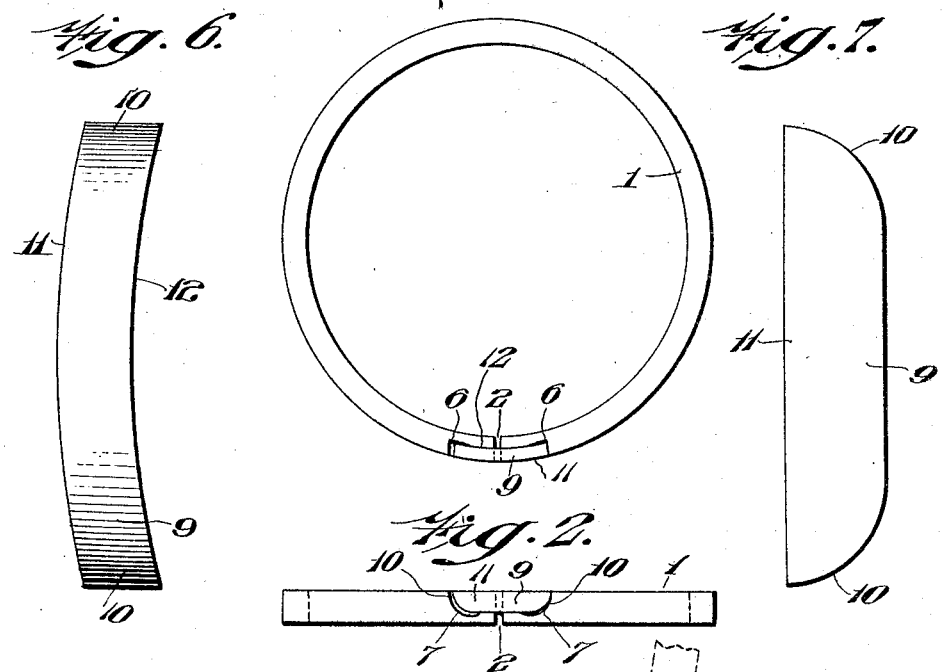
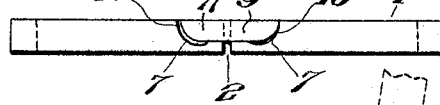
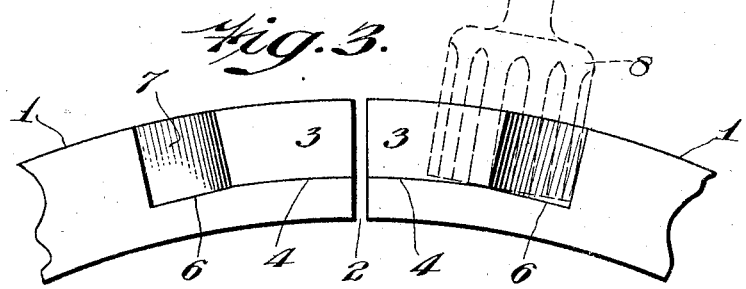
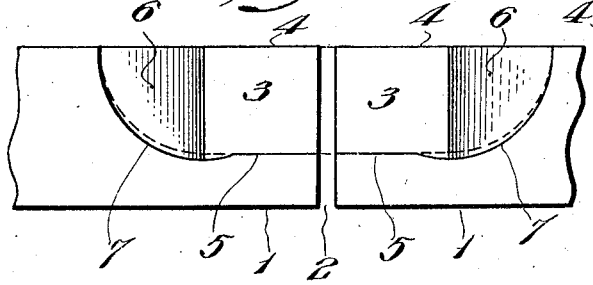
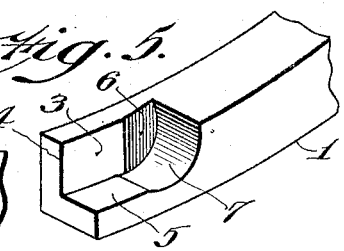
INVENTOR:
Walter W. Gray,
BY
ATTORNEYS.

Patented Feb. 24, 1925.

1,527,794

UNITED STATES PATENT OFFICE.

WALTER W. GRAY, OF PHILADELPHIA, PENNSYLVANIA.

SPLIT-RING PISTON PACKING.

Application filed November 28, 1924. Serial No. 752,514.

*To all whom it may concern:*

Be it known that I, WALTER W. GRAY, a citizen of the United States, residing at Philadelphia, in the county of Philadelphia and State of Pennsylvania, have invented a certain new and useful Split-Ring Piston Packing, of which the following is a specification.

This invention generally stated relates to pistons for piston packing and has more particular relation to pistons of that class or type in which a split metallic packing is used for maintaining pistons fluid tight within the working cylinder of a steam or other motive power engine.

One object of the present invention is to lower the cost of production of a piston ring of the character under consideration by eliminating hand finishing, since a milling tool may be employed for forming the entire recess to receive the filling piece.

A further object resides in providing a recessed portion with curved end walls so that the inherent strength of a piston ring is maintained and the liability of checking or breakage resulting from sharp angles or corners is overcome and prevented by the curved recessed ends.

A further object is to provide a ring of the character stated in which the filling piece lies substantially flush with the peripheral surface of the ring in contradistinction from having one end of the filler piece at an acute angle with respect to the end wall and thereby cause binding against the inner face of a piston cylinder.

For the purpose of illustrating my invention I have shown in the accompanying drawings forms thereof which are at present preferred by me, since the same are found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 1, is a view in side elevation of a split piston ring embodying the invention.

Fig. 2, is an edge view thereof.

Fig. 3, is a fragmentary view drawn to a larger scale and illustrating the manner of forming a recess by means of a milling tool, the latter being shown in dotted lines.

Fig. 4, is a fragmentary view illustrating the parts as milled out.

Fig. 5, is a perspective view of one end of the piston ring as shown in Fig. 4.

Fig. 6, is a detail view of the filler piece shown in Fig. 1, and

Fig. 7, is a view of the filler piece corresponding to the view thereof shown in Fig. 2.

This invention relates to a split piston ring and specifically to a construction comprising a filling piece located at the split to prevent leakage. A recess is formed in one side of the periphery of the ring which recess extends across the split. The bottom portion of the recess presents a convex surface while the side portion of the recess lies in a plane parallel to the side of the ring. This side portion at its ends curves outwardly to the side face of the ring. The filling piece is shaped to fit in the recess and extends across the split. While it conforms generally in shape to the recess it is made sufficiently short to permit the necessary expansion and contraction of the ring in use. The recess in the ring is formed by a milling operation, the same extending inwardly from the side of the ring. The curved end portions are also formed by a milling tool.

Referring specifically to the drawings:—

1 designates a metallic piston ring split as at 2. The recess which extends across the split 2 is formed in one side of the periphery of the ring and is designated 3. The bottom portion of the recess for a portion of its extent upon each side of the split 3 is convexed as at 4 in concentric relation with the ring periphery. The side portion for a portion of its extent lies in a plane parallel to the side of the ring and is designated 5. The bottom portion 4 at each end terminates in a depressed portion 6 and the side portion at its ends terminates in portions 7 outwardly curved to the side face of the ring. The above described recessed portion may be easily effected by means of a milling tool shown by dotted lines in Fig. 3, and designated 8. The entire recessed parts may be formed with the same milling tool and without the requirement of any subsequent hand finishing. Thus the necessary exactness in fitting of the ends of the filling piece 9 are effected at the very material and important saving in the cost of production of the packing ring as well as securing accuracy of fit. The filling piece designated 9 is seated within the recessed portion previously described and extends across the split. While it conforms generally in contour or shape to the recess it is made sufficiently short to permit of the necessary expansion and contraction of the ring in use. The filling piece is provided with curved ends 10 to substantially conform to the curved ends 7 of the recess and the upper and lower faces of the filling piece are designated 11 and 12 respectively and are formed upon arcs of circles so that when seated within the recess of the ring the member 12 of the filling piece is substantially concentric with the bottom of the recess and the part 11 is flush with the outer periphery of the ring.

It will now be apparent that I have devised a novel and useful construction split ring piston packing, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

As a new article of manufacture, a split piston ring having a recess formed in its periphery along one edge and at its adjacent ends and extending across the split, the bottom portion of the said recess having convexed portions 4 for a portion of its extent upon opposite sides of the split, said convexed portions terminating in depressed portions 6, there being portions 5 of the said recess lying in a plane parallel to the side of the ring for a portion of their extent upon each side of the split, said side portions terminating at their ends in walls 7 curving outwardly to the side face of the ring, and a filling piece shaped to fit into the recess and extend across the split, said filling piece conforming generally to the shape of the recess, throughout its body portion, but having its ends initially slightly out of contact with said walls 6 and 7.

WALTER W. GRAY.

Witnesses:
E. HAYWOOD FAIRBANKS,
LEONARD L. KALISH.